[12] United States Patent
Keuthage et al.

(10) Patent No.: US 10,427,723 B2
(45) Date of Patent: Oct. 1, 2019

(54) MOTOR VEHICLE

(71) Applicant: Bayerische Motoren Werke Aktiengesellschaft, Munich (DE)

(72) Inventors: Lennart Keuthage, Munich (DE); Robert Loch, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 33 days.

(21) Appl. No.: 15/789,864

(22) Filed: Oct. 20, 2017

(65) Prior Publication Data
US 2018/0057073 A1 Mar. 1, 2018

Related U.S. Application Data

(63) Continuation of application No. PCT/EP2016/058432, filed on Apr. 15, 2016.

(30) Foreign Application Priority Data

Apr. 22, 2015 (DE) ........................ 10 2015 207 377

(51) Int. Cl.
*B60N 99/00* (2006.01)
*B62D 29/04* (2006.01)
*B62D 25/02* (2006.01)
*B62D 25/20* (2006.01)

(52) U.S. Cl.
CPC ......... *B62D 29/046* (2013.01); *B62D 25/025* (2013.01); *B62D 25/2036* (2013.01)

(58) Field of Classification Search
CPC . B62D 29/046; B62D 25/025; B62D 25/2036
See application file for complete search history.

(56) References Cited

U.S. PATENT DOCUMENTS

| 2,254,457 | A | * | 9/1941 | Swallow | B62D 23/00 296/203.01 |
| 4,169,574 | A | * | 10/1979 | Garvey | B60N 2/12 248/429 |
| 6,092,862 | A | * | 7/2000 | Kuwahara | B62D 29/043 296/184.1 |
| 9,598,107 | B2 | | 3/2017 | Tyan et al. | |
| 2012/0119546 | A1 | | 5/2012 | Honda et al. | |

(Continued)

FOREIGN PATENT DOCUMENTS

CN 103129616 A 6/2013
DE 10 2005 054967 A1 5/2007

(Continued)

OTHER PUBLICATIONS

PCT/EP2016/058432, International Search Report dated Nov. 15, 2016 (Two (2) pages).

(Continued)

*Primary Examiner* — Lori L Lyjak
(74) *Attorney, Agent, or Firm* — Crowell & Moring LLP

(57) ABSTRACT

A vehicle body is disclosed. The vehicle body includes a lateral sill panel device made of fiber-reinforced plastic, which is formed as a hollow profile with an external wall element as an impact face, and a floorpan structure including a transverse seat support made of fiber-reinforced plastic, which extends in the Y-direction of the vehicle body substantially to the external wall element.

19 Claims, 3 Drawing Sheets

(56) References Cited

U.S. PATENT DOCUMENTS

| | | | |
|---|---|---|---|
| 2013/0234467 A1* | 9/2013 | Brown, Jr. | B60J 5/0487 |
| | | | 296/181.1 |
| 2014/0117716 A1 | 5/2014 | Patberg et al. | |
| 2016/0039462 A1* | 2/2016 | Kempf | B62D 25/20 |
| | | | 296/204 |
| 2016/0068199 A1 | 3/2016 | Matthiessen et al. | |
| 2016/0214666 A1* | 7/2016 | Ortmann | C25D 11/00 |
| 2016/0229466 A1* | 8/2016 | Schnaufer | B62D 29/048 |
| 2016/0362140 A1* | 12/2016 | Majamaeki | B62D 25/2036 |

FOREIGN PATENT DOCUMENTS

| | | | | |
|---|---|---|---|---|
| DE | 10 2008 036175 A1 | 2/2010 | | |
| DE | 10 2011 117 951 A1 | 5/2012 | | |
| DE | 10 2011 051 698 A1 | 1/2013 | | |
| DE | 10 2012 221 606 A1 | 6/2013 | | |
| DE | 10 2012 020 432 B3 | 2/2014 | | |
| DE | 102013001040 A1 * | 7/2014 | | B62D 25/025 |
| DE | 10 2013 001 945 A1 | 8/2014 | | |
| DE | 10 2013 209 097 A1 | 11/2014 | | |
| DE | 10 2013 011528 A1 | 1/2015 | | |
| GB | 495254 A * | 11/1938 | | B62D 23/00 |
| JP | H07 89463 A | 4/1995 | | |
| JP | 2013-126811 A | 6/2013 | | |
| JP | 2015-63207 A | 4/2015 | | |

OTHER PUBLICATIONS

German Search Report for corresponding DE patent application 10 2015 207 377.7 w/translation of Explanation for Section C dated Feb. 16, 2016 (Fourteen (14) pages).

Chinese Office Action Issued in Chinese counterpart application No. 201680022975.1 dated Jan. 11, 2019 (Seven (7) pages).

* cited by examiner

MOTOR VEHICLE

CROSS REFERENCE TO RELATED APPLICATIONS

This application is a continuation of PCT International Application No. PCT/EP2016/058432, filed Apr. 15, 2016, which claims priority under 35 U.S.C. § 119 from German Patent Application No. 10 2015 207 377.7, filed Apr. 22, 2015, the entire disclosures of which are herein expressly incorporated by reference.

BACKGROUND AND SUMMARY OF THE INVENTION

The invention relates to a vehicle body.

Lateral sill panels as impact protection elements in a vehicle body are known.

The crash capability of the lateral sill panels is determined by crash tests. Euro NCAP (European New Car Assessment Program) is an organization which carries out crash tests using new automobile types, thereafter evaluating the safety of the vehicles. The side-impact post test is part of the Euro NCAP crash test. The impact of the vehicle side on a tree or mast, for example, is simulated herein in that the vehicle at 29 km/h is propelled against a solid post. This crash test is a standard requirement in the U.S. The load event FMVSS214 as a post impact is defined as follows: the vehicle on a slide moves laterally in the direction of the post (rigid, from steel); the slide is decelerated and the vehicle continues to slide against the post; the impact velocity of the vehicle on the post is 32 km/h. Potential injuries to the vehicle occupant in the region of the head, the torso, and the lower body can be detected after the crash with the aid of a dummy.

The configuration of the floorpan assembly of the vehicle and of the lateral sill panels to date has been performed by way of a metal construction. The components of the sill, the transverse seat support, and the floor panel are major participants in conventional structural concepts of the floorpan assembly. There is a clear separation in terms of components and functions between the lateral sill panel and the floorpan assembly. The sill functions as a flexural support between the A-pillar and the C-pillar and in the post crash is supported by the transverse seat support and the floor panel. The absorption of energy is performed by buckling in the transverse seat support and in the floorpan assembly, and by flexing in the lateral sill panel. The crash load is distributed across an area of a wide support region. In this manner, a large region of the floorpan assembly is deformed, and the resulting flexural stress of the lateral sill panel counteracts the intrusion. On account of the comparatively low energy absorption efficiency of metallic materials, a large material quantity has to be deformed. In the case of identical weight, this manifests itself in greater intrusions of the post into the vehicle interior or, in the case of a functionally identical layout, in a higher weight of the metallic structure.

It is an object of the invention to further reduce the intrusion and to provide a comparatively light vehicle body in a cost-effective production method having diverse design possibilities.

This object is achieved according to the invention by a vehicle body having a lateral sill panel device from fiber-reinforced plastic, which as a hollow section having an external wall element is formed as an impact face, and a floorpan structure which has a transverse seat support from fiber-reinforced plastic, which in the Y direction of the vehicle extends substantially to the external wall element.

On account of the transverse seat support extending substantially to the external wall element, crash energy can be absorbed by way of the transverse seat support. The transverse seat support thus participates directly in the absorption of energy. This enables a high consistent force level from the outset (in the initial contact between the lateral sill panel device and the post). This results in a short intrusion path in the case of a predefined crash energy. The lateral sill panel device herein is not primarily stressed in a flexural manner. The lateral sill panel device in the crash is destroyed in a localized manner at the point of impact and is not bent inward like a support across the entire vehicle length. Thus, a primary absorption of energy is provided in the continuous transverse seat support, and a secondary absorption of energy is provided in the lateral sill panel device. The lateral sill panel device thus no longer functions as a bending beam. The absorption of energy is performed from the outside to the inside, by way of the destruction of the components. The intrusion is significantly reduced on account thereof. While known vehicle bodies from metal under test conditions display an intrusion of 250 to 350 mm, a vehicle body according to the invention at the same or a lower weight can display an intrusion of now only 150 to 250 mm.

The use of fiber-reinforced plastic, in particular of carbon fiber-reinforced plastic (CRP), guarantees a low weight of the impact protection element according to the invention. The advantage herein is that a CRP part which can absorb as much energy as a metal part is only approximately one half to one third of the weight. On account thereof, the vehicle becomes lighter and consumes less fuel. Moreover, an absorption of energy by axial crushing of the fiber-reinforced plastic is provided.

Moreover, the embodiment of the lateral sill panel device having the extent of the transverse seat support according to the invention can be carried out as a monocoque construction or a hollow-section construction, since the layout of the lateral sill panel device is largely independent of the crash loads. A cost-effective production method having diverse variants in terms of design is enabled on account thereof.

Further advantages are derived from the above-described arrangement according to the invention of the lateral sill panel device and of the transverse seat support in the crash load path. The lateral sill panel device can be conceived for other functions in a targeted manner. Since the crash load is conjointly absorbed by the transverse seat support by axial crushing, the lateral sill panel device can be conceived for and optionally reduced to other overall vehicle functions (noise, vibration, and harshness (NVH), door concept, etc.). For example, the installation space of the lateral sill panel device can be reduced, leading to easier ingress to the vehicle.

In one particularly preferred embodiment, the floorpan structure has a floor panel from fiber-reinforced plastic. On account thereof, the floorpan of the vehicle is provided and the absorption of energy during the crash can be further increased.

According to one embodiment, the floor panel extends substantially to an internal wall element of the lateral sill panel device. On account thereof, only the transverse seat support having the lateral sill panel device serves initially as the side crash element, and floor panels that can be designed in a variable manner can be used. Moreover, the lateral sill panel device can be joined to the floorpan in the Y direction. In another embodiment, the floor panel extends substantially to the external wall element of the lateral sill panel device. On account thereof, the transverse seat support having the lateral sill panel device and the floor panel serve as side crash elements, on account of which the absorption of energy during the crash is further increased.

According to a further embodiment, the lateral sill panel device has an upper and a lower lateral sill panel, the external wall faces of the two being disposed so as to terminate in a flush manner in order to form the external wall element. On account thereof, the lateral sill panel device can be adapted to constructive parameters in a variable manner. It is advantageous herein for the external wall faces of the upper and of the lower sill panel to be disposed so as to terminate in a flush manner in the region of the transverse seat support, or in the region of the transverse seat support and of the floor panel, respectively.

It is advantageous herein for the floor panel to be disposed between the upper lateral sill panel and the lower lateral sill panel, and/or for the transverse seat support to be disposed between the upper lateral sill panel and the lower lateral sill panel.

In one further embodiment, the transverse seat support is received in the lateral sill panel device. It is advantageous herein for the lateral sill panel device to be formed by a single lateral sill panel and to receive the transverse seat support.

According to a further embodiment, the upper lateral sill panel is formed in two parts, as a first upper lateral sill panel and a second upper lateral sill panel. This results in diverse design possibilities.

It is thereby conceivable for the transverse seat support to be arranged between the first upper lateral sill panel and the second upper lateral sill panel. A flatter arrangement can thus be provided for the transverse seat support and for the upper lateral sill panel.

According to a further embodiment, the first upper lateral sill panel and the second upper lateral sill panel are routed upward in order for a wall element of the vehicle body, in particular a vehicle pillar, to be formed. In this way, a further wall element of the vehicle body, for example a vehicle pillar, can be formed by the upper lateral sill panels without any further components being required.

The invention also includes a vehicle having a vehicle body according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
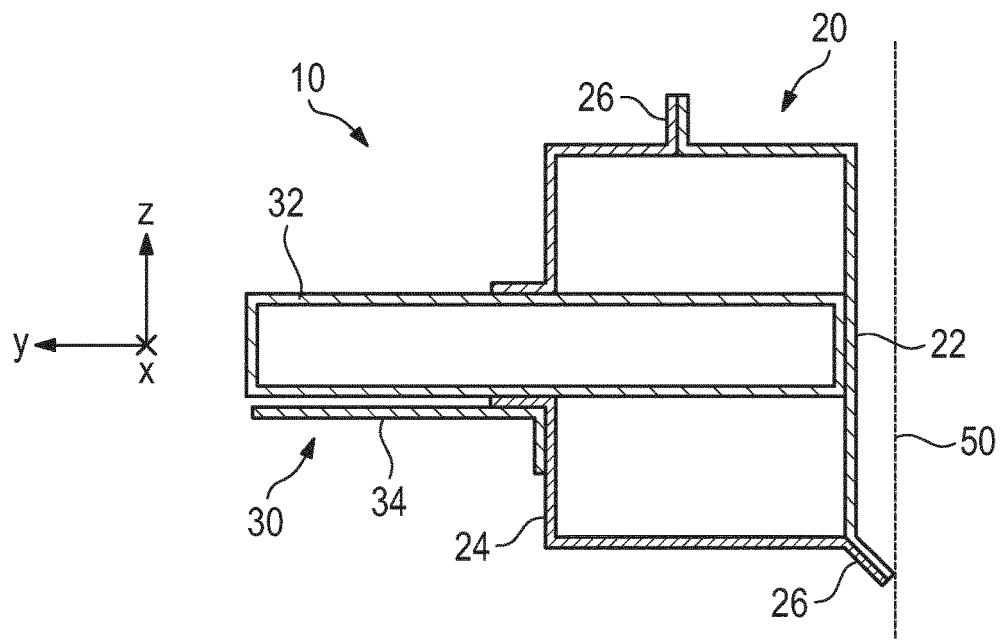
FIG. 1 shows an exemplary embodiment of the vehicle body according to the invention in a sectional view.

FIG. 1 shows an exemplary embodiment of a vehicle body 10 according to the invention. The vehicle body 10 includes a lateral sill panel device 20 from fiber-reinforced plastic. The lateral sill panel device 20 has an external wall element 22 which serves as an impact face and an internal wall element 24, the wall elements being connected at flanges 26 or being integrally configured.

The vehicle body 10 moreover includes a floorpan structure 30 having a transverse seat support 32 from fiber-reinforced plastic, which in the Y direction of the vehicle extends substantially to the external wall element 22. As can be seen in FIG. 1, the transverse seat support 32 herein bears on the external wall element 22. It is also possible for the transverse seat support 32 to be fixedly connected to the external wall element 22.

The floorpan structure 30 moreover includes a floor panel 34 from fiber-reinforced plastic, which extends to the internal wall element 24 of the lateral sill panel device 20. It can be seen in FIG. 1 that the floor panel 34 bears on the internal wall element 24. It is also possible for the floor panel 34 to be fixedly connected to the internal wall element 24.

A vehicle exterior 50 of the vehicle body 10 is also shown schematically in FIG. 1.

Figure 2:
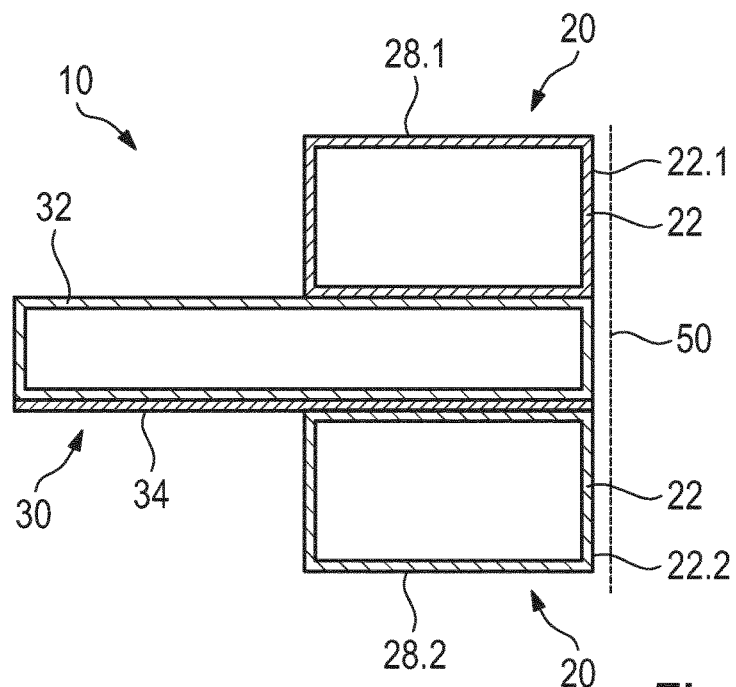
FIG. 2 shows another exemplary embodiment of the vehicle body according to the invention in a sectional view.

FIG. 2 shows another exemplary embodiment of the vehicle body 10 according to the invention. The lateral sill panel device 20 herein includes an upper lateral sill panel 28.1 having an upper external wall face 22.1, and a lower lateral sill panel 28.2 having a lower external wall face 22.2. The transverse seat support 32 and the floor panel 34 are disposed between the upper lateral sill panel 28.1 and the lower lateral sill panel 28.2. The upper lateral sill panel 28.1 and the lower lateral sill panel 28.2 herein are preferably configured as integral hollow sections. This enables more cost-effective production methods, on the one hand, and enables a variable design of the link to the A-pillar, B-pillar and/or C-pillar, and to the transverse seat support 32 of the vehicle body 10, on the other hand. Moreover, a variable design of the lateral sill panel device 20 is also possible. In summary, the integral construction mode offers a reduction in terms of cutting waste and costs. However, it is also conceivable for the upper lateral sill panel 28.1 and for the lower lateral sill panel 28.2 to in each case be configured in two or multiple parts, should this be required for reasons of construction.

The external wall element 22 is formed by the upper external wall face 22.1 and by the lower external wall face 22.2. The floor panel 34 herein, like the transverse seat support 32, extends substantially to the external wall element 22 of the lateral sill panel device 20. As can be seen in FIG. 2, the upper external wall face 22.1 and the lower external wall face 22.2 are disposed so as to terminate in a flush manner with the transverse seat support 32 and the floor panel 34. The transverse seat support 32, the floor panel 34, the upper lateral sill panel 28.1, and the lower lateral sill panel 28.2 herein can be fixedly interconnected.

Figure 3:
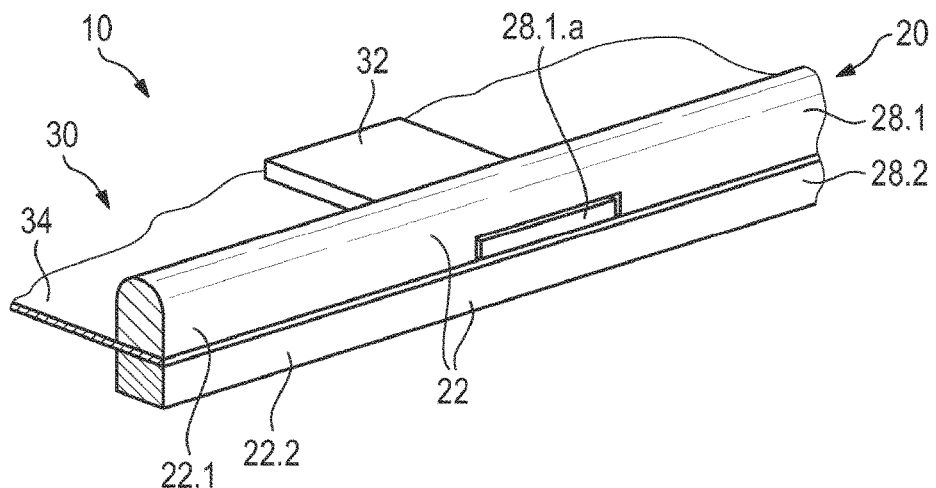
FIG. 3 shows a further exemplary embodiment of the vehicle body according to the invention in a perspective view.

FIG. 3 shows a perspective view of an embodiment having an upper lateral sill panel 28.1 and a lower lateral sill panel 28.2. The transverse seat support 32 and the floor panel 34 are disposed between the upper lateral sill panel 28.1 and the lower lateral sill panel 28.2. The upper lateral sill panel 28.1 herein has a recess 28.1.a such that the upper lateral sill panel 28.1 is disposed above the transverse seat support 32 and the floor panel 34.

Figure 4:
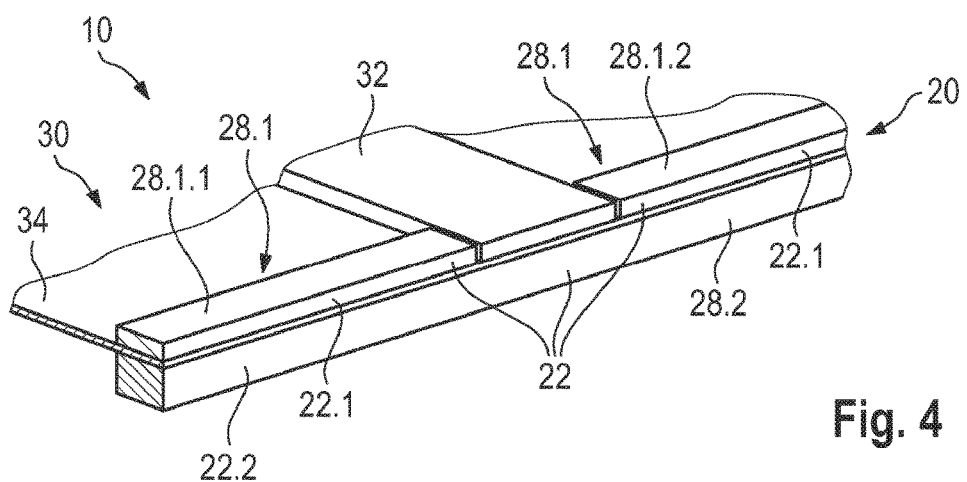
FIG. 4 shows a further exemplary embodiment of the vehicle body according to the invention in a perspective view.

FIG. 4 shows a perspective view of a further embodiment having an upper lateral sill panel 28.1 and a lower lateral sill panel 28.2. The floor panel 34 is disposed between the upper lateral sill panel 28.1 and the lower lateral sill panel 28.2. The upper lateral sill panel 28.1 is formed in two parts, as a first upper lateral sill panel 28.1.1 and a second upper lateral sill panel 28.1.2, where the transverse seat support 32 is disposed between the first upper lateral sill panel 28.1.1 and the second upper lateral sill panel 28.1.2. As can be seen in FIG. 4, the transverse seat support 32, the first upper lateral sill panel 28.1.1 and the second upper lateral sill panel 28.1.2 have the same height. On account thereof, a planar face for attaching further body parts is provided. However, it is also possible for these components to be of dissimilar height.

Figure 5:
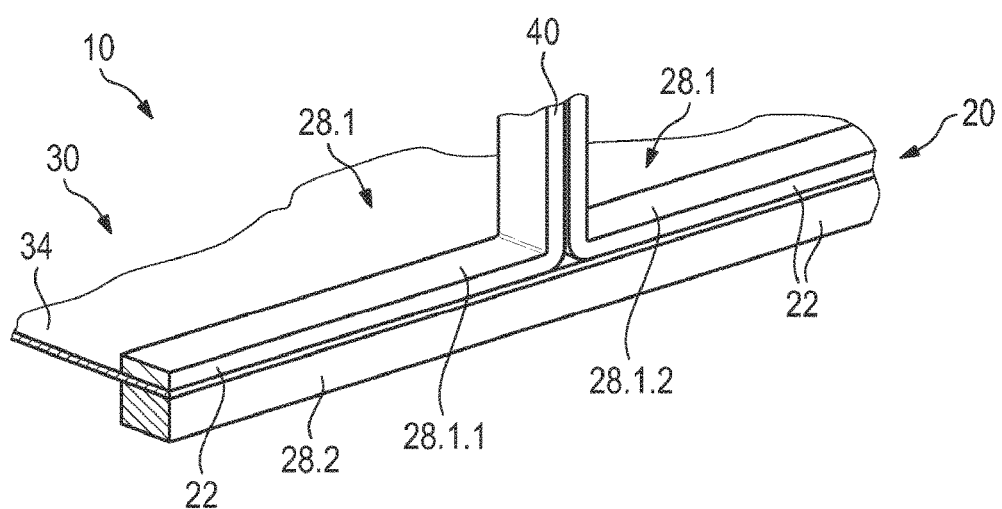
FIG. 5 shows a further exemplary embodiment of the vehicle body according to the invention in a perspective view.

FIG. 5 shows a perspective view of a further embodiment having a first upper lateral sill panel 28.1.1, a second upper lateral sill panel 28.1.2 and a lower lateral sill panel 28.2. For reasons of simplification the transverse seat support 32 is not shown. However, it is possible that the embodiment of FIG. 5 is applied to the arrangement of the transverse seat support 32 having the upper lateral sill panel 28.1 that is shown in FIGS. 2 to 4. As is shown in FIG. 5, the upper lateral sill panel 28.1 has the first upper lateral sill panel 28.1.1 and the second upper lateral sill panel 28.1.2 which are routed upward, thus forming a wall element, in particular a vehicle pillar 40 (for example a B-pillar) of the vehicle body 10. It is possible herein that two transverse seat supports 32 (not shown) are disposed in the X direction of the vehicle in front of and behind the B-pillar that is formed by the first upper lateral sill panel 28.1.1 and the second upper lateral sill panel 28.1.2. The first upper lateral sill panel 28.1.1 and the second upper lateral sill panel 28.1.2 herein can be configured as integral hollow sections.

It is conceivable in all embodiments shown that the transverse seat support 32 and the floor panel 34 are integrally configured, thus serving as a contiguous component for the absorption of primary energy.

| List of reference signs: | |
|---|---|
| 10 | Vehicle body |
| 20 | Lateral sill panel device |
| 22 | External wall element |
| 22.1 | Upper external wall face |
| 22.2 | Lower external wall face |
| 24 | Internal wall element |
| 26 | Flange |
| 28.1 | Upper lateral sill panel |
| 28.1.a | Recess |
| 28.1.1 | First upper lateral sill panel |
| 28.1.2 | Second upper lateral sill panel |
| 28.2 | Lower lateral sill panel |
| 30 | Floorpan structure |
| 32 | Transverse seat support |
| 34 | Floor panel |
| 40 | Vehicle pillar |
| 50 | Vehicle exterior |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle body, comprising:
a lateral sill panel device, wherein the lateral sill panel device is made of fiber-reinforced plastic and includes an external wall element as an impact face; and
a floorpan structure, wherein the floorpan structure includes a transverse seat support which is made of fiber-reinforced plastic and which extends in a Y direction of the vehicle body substantially to the external wall element.

2. The vehicle body as claimed in claim 1, wherein the floorpan structure includes a floor panel made of fiber-reinforced plastic.

3. The vehicle body as claimed in claim 2, wherein the floor panel extends substantially to an internal wall element of the lateral sill panel device.

4. The vehicle body as claimed in claim 2, wherein the floor panel extends substantially to the external wall element.

5. The vehicle body as claimed in claim 1, wherein the lateral sill panel device includes an upper lateral sill panel and a lower lateral sill panel and wherein respective external wall faces of the upper lateral sill panel and the lower lateral sill panel terminate flush such that the external wall faces form the external wall element.

6. The vehicle body as claimed in claim 2, wherein the lateral sill panel device includes an upper lateral sill panel and a lower lateral sill panel and wherein respective external wall faces of the upper lateral sill panel and the lower lateral sill panel terminate flush such that the external wall faces form the external wall element.

7. The vehicle body as claimed in claim 3, wherein the lateral sill panel device includes an upper lateral sill panel and a lower lateral sill panel and wherein respective external wall faces of the upper lateral sill panel and the lower lateral sill panel terminate flush such that the external wall faces form the external wall element.

8. The vehicle body as claimed in claim 4, wherein the lateral sill panel device includes an upper lateral sill panel and a lower lateral sill panel and wherein respective external wall faces of the upper lateral sill panel and the lower lateral sill panel terminate flush such that the external wall faces form the external wall element.

9. The vehicle body as claimed in claim 5, wherein the floor panel is disposed between the upper lateral sill panel and the lower lateral sill panel.

10. The vehicle body as claimed in claim 5, wherein the transverse seat support is disposed between the upper lateral sill panel and the lower lateral sill panel.

11. The vehicle body as claimed in claim 9, wherein the transverse seat support is disposed between the upper lateral sill panel and the lower lateral sill panel.

12. The vehicle body as claimed in claim 1, wherein the transverse seat support is received in the lateral sill panel device.

13. The vehicle body as claimed in claim 5, wherein the upper lateral sill panel includes a first upper lateral sill panel and a second upper lateral sill panel.

14. The vehicle body as claimed in claim 9, wherein the upper lateral sill panel includes a first upper lateral sill panel and a second upper lateral sill panel.

15. The vehicle body as claimed in claim 10, wherein the upper lateral sill panel includes a first upper lateral sill panel and a second upper lateral sill panel.

16. The vehicle body as claimed in claim 13, wherein the transverse seat support is disposed between the first upper lateral sill panel and the second upper lateral sill panel.

17. The vehicle body as claimed in claim 13, wherein the first upper lateral sill panel and the second upper lateral sill panel include respective upward extending portions and wherein the upward extending portions form a wall element of the vehicle body.

18. The vehicle body as claimed in claim 16, wherein the first upper lateral sill panel and the second upper lateral sill panel include respective upward extending portions and wherein the upward extending portions form a wall element of the vehicle body.

19. A vehicle comprising a vehicle body as claimed in claim 1.

* * * * *